(12) United States Patent
DeVito (10) Patent No.: US 7,550,738 B1
(45) Date of Patent: Jun. 23, 2009

(54) NUCLEAR MATERIAL IDENTIFICATION AND LOCALIZATION

(75) Inventor: Raymond P. DeVito, North Logan, UT (US)

(73) Assignee: Utah State University, North Logan, UT (US)

( * ) Notice: Subject to any disclaimer, the term of this patent is extended or adjusted under 35 U.S.C. 154(b) by 256 days.

(21) Appl. No.: 11/413,480

(22) Filed: Apr. 28, 2006

Related U.S. Application Data (60) Provisional application No. 60/676,082, filed on Apr. 28, 2005.

(51) Int. Cl.
*G01T 1/00* (2006.01)
(52) U.S. Cl. .................................................. 250/393
(58) Field of Classification Search ................ 250/393, 250/370.13, 370.12, 338.4, 338.1, 370.01, 250/336.1, 253
See application file for complete search history.

(56) References Cited

U.S. PATENT DOCUMENTS

| | | | | |
|---|---|---|---|---|
| 5,821,541 | A * | 10/1998 | Tumer | 250/370.09 |
| 5,861,627 | A | 1/1999 | Basko et al. | |
| 6,781,134 | B1 * | 8/2004 | Murray et al. | 250/370.13 |
| 2004/0232323 | A1 * | 11/2004 | Bosco et al. | 250/253 |
| 2005/0205792 | A1 * | 9/2005 | Rousso et al. | 250/363.04 |
| 2007/0023671 | A1 * | 2/2007 | Britten | 250/393 |

OTHER PUBLICATIONS

Parra, "Reconstruction of cone-beam projections from Compton scattered data," Aug. 2000, IEEE Transactions on Nuclear Science, vol. 47, No. 4, pp. 1543-1550.*
Lackie, "A directional algorithm for the electronically collimated radiation detector," Louisiana State University, May 2007.*
Llacer, "Maximum likelihood estimator image reconstruction for emission tomography in nuclear medicine," 1990, IEEE, Colloquium in South America, Proceedings of the 1990 IEEE, pp. 119-125.*
Norton, S. J. "Compton scattering tomography". J. Appl. Phys. 1994 pp. 2007-2015. vol. 76, publisher American Institute of Physics, Melville.
McKisson, J. E., P. S. Haskins, D. P. Henderson Jr., K. C. Neelands, C. K. Wang, and T. Evans. "3-D imaging of complex source fields with a Compton Camera Imager". IEEE Trans. Nuc. Sci. 1997 pp. 916-921 vol. 44, publisher IEEE, Piscataway.
Parra, L. C. "Reconstruction of cone-beam projections from Compton scattered data". IEEE Trans. Nuc. Sci. 2000. pp. 1543-1550 vol. 47, publisher IEEE, Piscataway.
Cree, M. J. and P. J. Bones. "Towards direct reconstruction from a gamma camera based on Compton scattering". IEEE Trans. Med. Imaging 1994. pp. 398-407. vol. 13, publisher IEEE, Piscataway.

(Continued)

*Primary Examiner*—David P Porta
*Assistant Examiner*—Kiho Kim (57) ABSTRACT

A radioisotope identification and localization device having at least one radiation detector with three dimensional event localization that utilizes a spatial correlation of projection vectors arising from Compton scattering of gamma ray emissions. Source identification and location is supplied by a reconstruction that searches for solutions with radioactive material of unknown type. Detection, identification and localization does not require full energy deposition. Identification and location of known or unknown radioactive material somewhere in a large active area of interrogation is achieved.

22 Claims, 6 Drawing Sheets

OTHER PUBLICATIONS

Sauve, A. C., A. O. Hero III, W. L. Rogers, S. J. Wilderman, and N. H. Clinthorne. "3D image reconstruction for a Compton SPECT camera model". IEEE Trans. Nuc. Sci. 1999. pp. 2075-2084. vol. 46, publisher IEEE, Piscataway.

Tomitani, T. and M. Hirasawa. "Analytical image reconstruction of cone-beam projections from limited-angle Compton camera data". IEEE Trans. Nuc. Sci. 2003. pp. 1602-1608. vol. 50, publisher IEEE, Piscataway.

Tomitani, T. and M. Hirasawa. "Image reconstruction from limited angle Compton camera data". Phys. Med. Biol. 2002. pp. 2129-2145. vol. 47, Publisher Institute of Physics Publishing, United Kingdom.

* cited by examiner

Gamma Ray Detectors (micro-array)

Back-projected cone defined by Compton scattering event

Intersection of cones defining location of gamma ray source

A = Isotopic Hypothesis
A' = New Isotopic Hypothesis
B = certainty greater than threshold
C = certainty less than threshold
D = no intersection point

NUCLEAR MATERIAL IDENTIFICATION AND LOCALIZATION

RELATED APPLICATIONS

This application claims priority to U.S. Patent Application No. 60/676,082 filed on Apr. 28, 2005, entitled "Nuclear Material Identification and Localization", and is incorporated herein by reference.

TECHNICAL FIELD

The present invention relates to radioisotope identification methods and devices and to radioisotope localization methods and devices

BACKGROUND

Identifying the existence and the location of an unknown quantity of radioactive material becomes more difficult when the source is intentionally shielded to hid characteristic radiation. With shielding, only the high energy gamma rays will emerge for possible detection. Unfortunately these same high energy gamma rays are hard to detect with full energy deposition making collection of the energy spectra inefficient. A system is desired that can both identify and locate a shielded source of unknown type and quantity using only a few detected gamma rays.

In addition to the control of unauthorized movement of radioactive material in production and storage sites this system could be deployed to monitor contraband radioactive material in large staging and storage sites. Identification of possible dirty bomb material or strategic nuclear material, including nuclear weapons, at docks, airports and other transportation and shipping hubs is possible.

The identification of the illicit movement of radioactive materials requires a system capable of identifying the material and locating the source. The ability to shield contraband radioactive material from detection render most energy spectrum based identification and localization systems ineffective. Activation methods require separation and isolation of suspected containers into a radiation hazardous environment. Innocuous monitoring of movement in open staging or storage areas is highly desirable but difficult to achieve.

Conventional monitoring techniques involve detection of emitted characteristic radiation, the identification of the energy of those emitted radiations and correlation of the measured energy or energies to the known emissions spectra of candidate radioisotopes. Various imaging techniques can be used in conjunction with the energy spectroscopy including physical collimation of the incident radiation, coded aperture arrays and conventional Compton cameras.

Detection methods such as gamma ray spectroscopy are sensitive and highly developed for determining the presence and radionuclide composition of radioactive materials. Gamma ray spectra are therefore useful for identifying a radioactive material, but not for locating it. Current methods for locating radioactive sources typically rely on collimators or intensity measurements at several positions, and require long data acquisition times due to low counts when the radioactive sources are shielded.

SUMMARY OF THE INVENTION

Disclosed are embodiments of methods for identifying the type and location of radioactive material. In one embodiment, multiple radiation detectors surround the area of inspection and record interactions involving Compton scattered events. A spatial correlation method is employed to identify the location and type of material based on a geometric convergence of possible backprojected paths. Searching is accomplished using a list of known emissions lines for radioactive material of interest.

Most identification techniques measure emitted energys and then make use of the known energy spectrum for emitted gamma rays to attempt to identify the measured lines with known lines and thereby identify the isotope. However, shielding of the contraband source will make only high energy gamma rays assessable for detection. Systems capable of identifying and locating the illicit transport of radioactive material are can be thwarted by concealment efforts that block characteristic emissions. We disclose a system that utilizes a spatial correlation of projection vectors arising from Compton scattering of any, but especially of, the high energy emissions. Source identification and location is supplied by a reconstruction that searches for solutions with radioactive material of unknown type. Detection does not require full energy deposition. Identification and location for contraband radioactive material somewhere in a large active area of interrogation is possible with perhaps fewer than 10 detected events.

DETAILED DESCRIPTION OF THE INVENTION

A radiation detection, localization and identification system is disclosed. A dispersed array of radiation detectors is networked to act as a unified detection system. This network has a wide area of view and high sensitivity to radiation sources. The system, a Dispersed Compton Radiation Detector system, utilizes the properties of Compton scattering for high energy gamma radiation. Rather than the traditional reliance on measuring full energy interactions for identification and possible localization, the Dispersed Compton Radiation Detector system uses a geometric correlation to identify and localize radiation sources.

The disclosed system works for all gamma ray emitting radioisotope sources but especially well for sources with high energy emissions emerging, such as shielded strategic nuclear material (SNM). Current systems using total energy identification work best for lower energy gamma rays, where full energy absorption is more probable. However, shielding used to conceal radioactive material also works best for lower energy gamma rays and relatively poorly for high energies. It is the same high energy gamma rays that are difficult to shield that also produce the geometric signature used by the Dispersed Compton Radiation Detector system. An intentionally concealed radiation source will still be visible by its high energy emissions.

Figure 1:
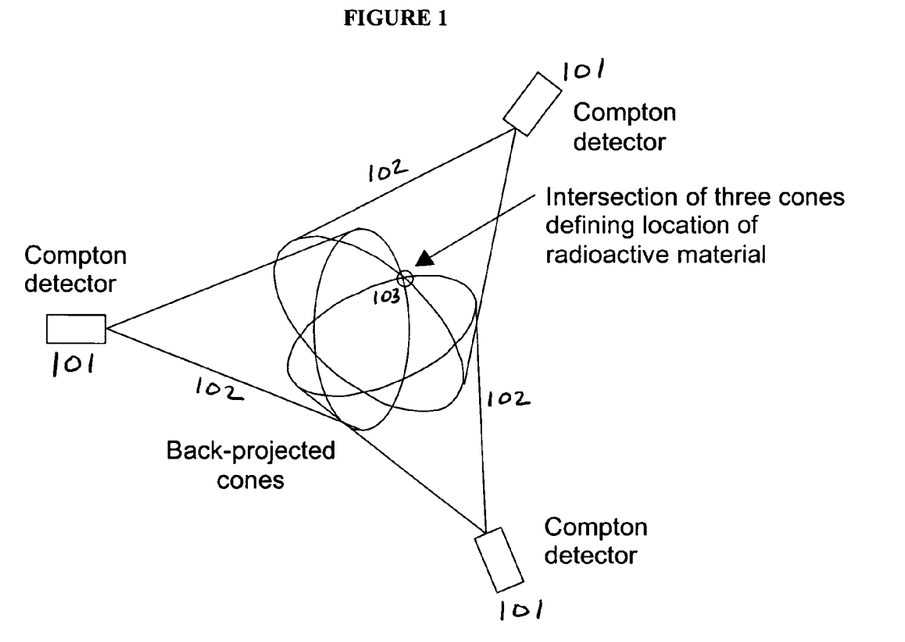
FIG. 1 shows the detector system dispersed around control area. Backprojected Compton cones intersect at the radioisotope source location showing how the intersection of backprojected cones determines the location of a radioactive material.

In one embodiment the deployment of the Dispersed Compton Radiation Detector system is accomplished by stationing a plurality of small radiation detectors with three-dimensional and multiple-interaction-point functionality around the area to be monitored as illustrated in FIG. 1. These detectors 101 are relatively inexpensive to produce compared with large detector systems typically used for full energy measurements. System sensitivity and area of coverage can be scaled by adjusting the number of individual detector stations 101. Data from the multiple locations are collected in an analysis station to produce alerts when suspicious material is detected. The Dispersed Compton Radiation Detector system will continue to operate (at slightly reduced sensitivity) even if individual detector modules 101 become inoperable. In contrast, conventional full energy systems that rely on single large detectors will become fully inoperable with detector failure.

In another embodiment a mobile detector system or systems can move around the area of interest and record events. In yet another embodiment a combination of mobile and station detectors can be used to acquire the data.

Figure 2:
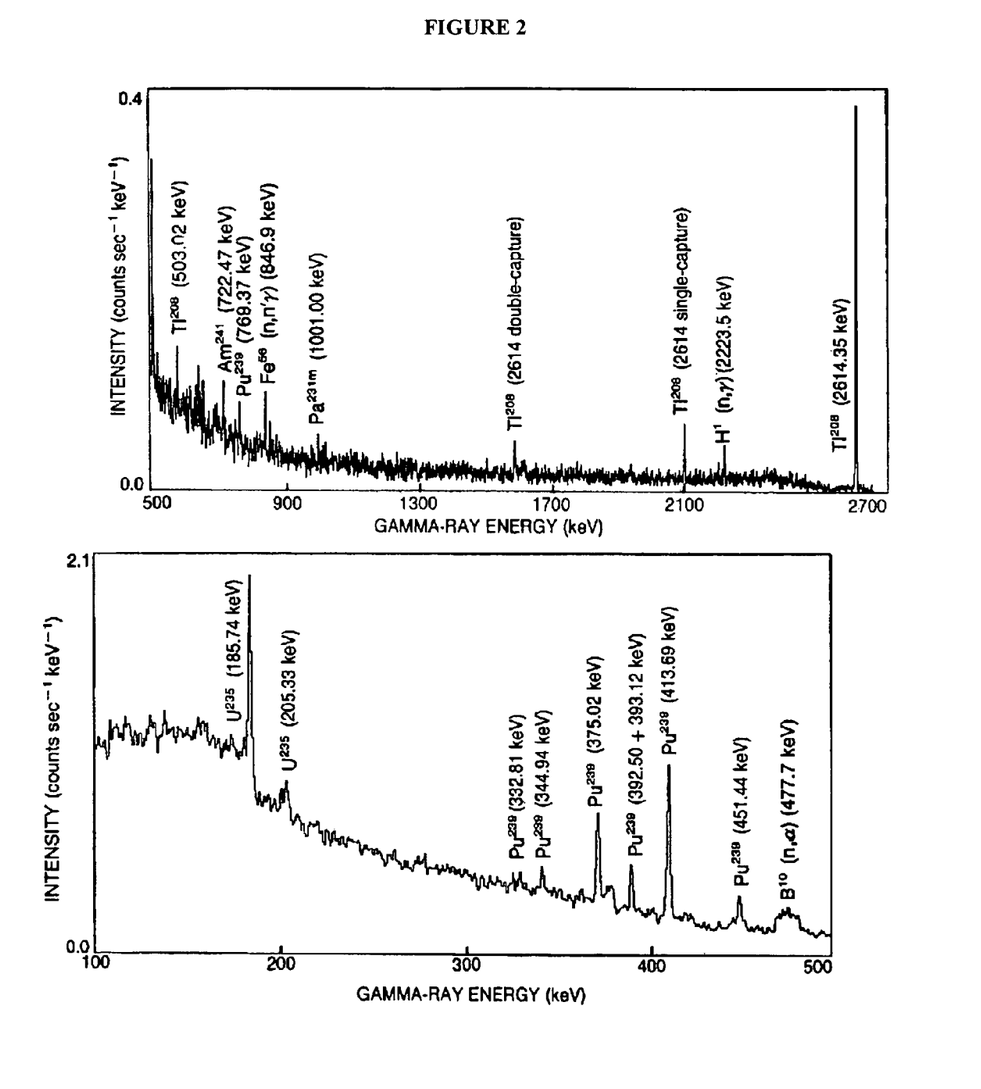
FIG. 2 shows the gamma-ray signal recorded by a germanium detector placed on top of a cruise missile launcher 3.4 meters from the lid for 10 minutes.

The Dispersed Compton Radiation Detector network operates is a very different mode than conventional radiation detection and localization systems. Each detector 101 has three dimensional event localization capability and the capability to measure individually multiple interaction points occurring simultaneously in the detector module. Each 3-D radiation detector detects Compton scattered events, identifying the primary 402 and secondary 401 interaction vertices. While the detector module 101 identifies the energy and three dimensional positions for the two interaction vertices, the detector module 101 does not need to identify which vertex is the primary and which is the secondary. The detected coordinates are used by the analysis engine to search for combinations of primary and secondary that are consistent with known physical scattering properties of gamma ray emissions from SNM (see FIG. 2) and other suspect radioactive material.

Capturing the entire energy for high energy emission is very difficult, large detection volumes are necessary, leading to expensive and bulky systems. The disclosed detection and localization system does not require detection of the full energy of each event to alert to the presences of a radioactive source, localize the source and identify the radioisotope.

The Dispersed Compton Radiation Detector system uses the concept that Compton events are easier to detect than full energy events for high energy emissions. We obtain information on the direction of the original gamma ray if the primary 402 and secondary 401 interaction points for Compton events are measured. While measuring full energy of the gamma ray is difficult, we start with the exact knowledge of the potential energies of gamma rays we are interested in detecting, e.g., weapons grade Uranium has a known set of gamma rays associated with it, Plutonium has another set, and other radioisotopes each have their own set of unique gamma ray emissions (shown in FIG. 2). The use of coincidence in a single detector or among detectors greatly reduces the random background. Looking for additional geometric correlation further reduces the false positive rate and provides a very reliable detection system. Further investigation by secondary methods (e.g. security personnel) of the source is made easier since localization of the source position and identification of the material is provided.

Detector systems to measure energy, timing and three dimensional position from gamma ray interactions are well know to those skilled in the art. Detector systems vary in their energy and position resolution, timing resolution, in their stopping power characteristics and in their cost. Choice of detectors will vary as one selects the target resolution and sensitivity desired while balancing cost considerations. The system described here will work for any of the detector choices made while performance results will vary accordingly.

Possible detector systems are: CsI(Tl) segmented detector using Photo Multiplier Tubes (PMTs), CsI(Tl) segmented detector using pin diodes, CsI(Tl) segmented detector using avalanche diodes, NaI(Tl) segmented detector using PMTs, NaI(Tl) single crystal planes using PMTs (similar to a conventional gamma camera), CsI(Tl) single crystal planes using PMTs (similar to a conventional gamma camera), BGO segmented detector using PMTs, LSO segmented detector using PMTs, Silicon pixilated detector, Intrinsic Ge pixilated detector, CZT pixilated detector planes, CZT volumetric detector, gas scintillation detectors or gas proportional detectors. Other similar gamma ray detectors can be used within the scope of this invention as would be understood by one of ordinary skill in the art of gamma ray detection.

Gamma rays from an external source can penetrate shielding (if present) and may interact in the radiation detector. The gamma ray produces a light scintillation or liberates charge in the detector material to make an electronic readable signal. This signal is processed to produce position and energy information for the event vertex.

Figure 6:
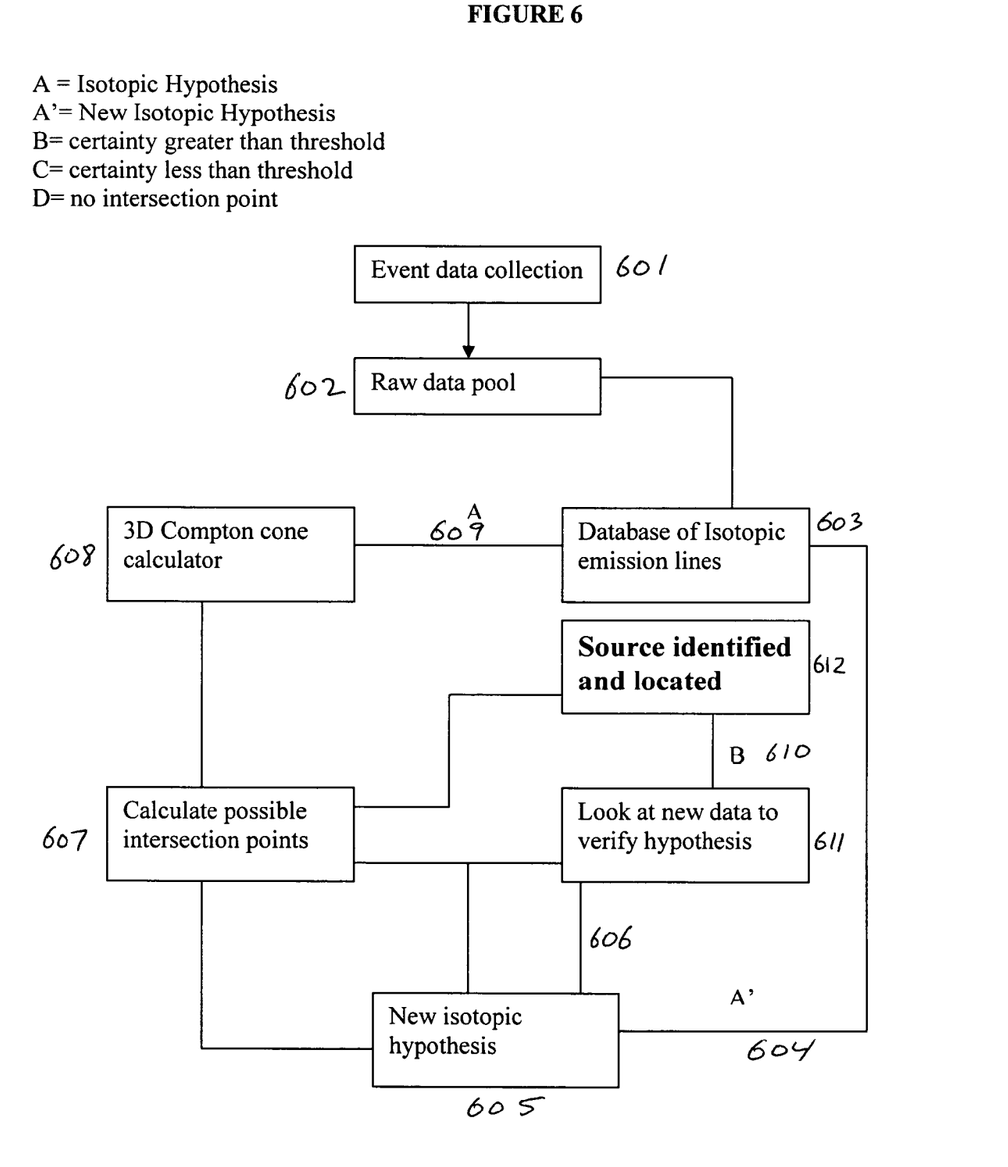
FIG. 6 is a flow chart showing the data acquisition, analysis and decision making paths for identification of a radioisotope.

The detectors provide measurement 601 of energy and position and event timing information. Timing information is used to measure relative time between two or more distinct interactions in the detector. If the two or more distinct interactions are from a single Compton scatter event, the relative timing of the events will be within the time for photons to traverse the distance between the event positions, usually on the order of a nanosecond. The timing resolution of the detectors is usually greater than this. Possible detector timing effects, such as charge transport or electronics response can make the coincidence window larger. One sets a coincidence time window to allow simultaneous events to be registered as possible multiple vertices from a single Compton scattering event. Multiple vertices can arise from two separate events that happen to interact in coincidence. The probability that accidental coincidences occur is a function of detector count rate. For most applications the count rate is very small, making accidental coincidences very rare.

Figure 5:
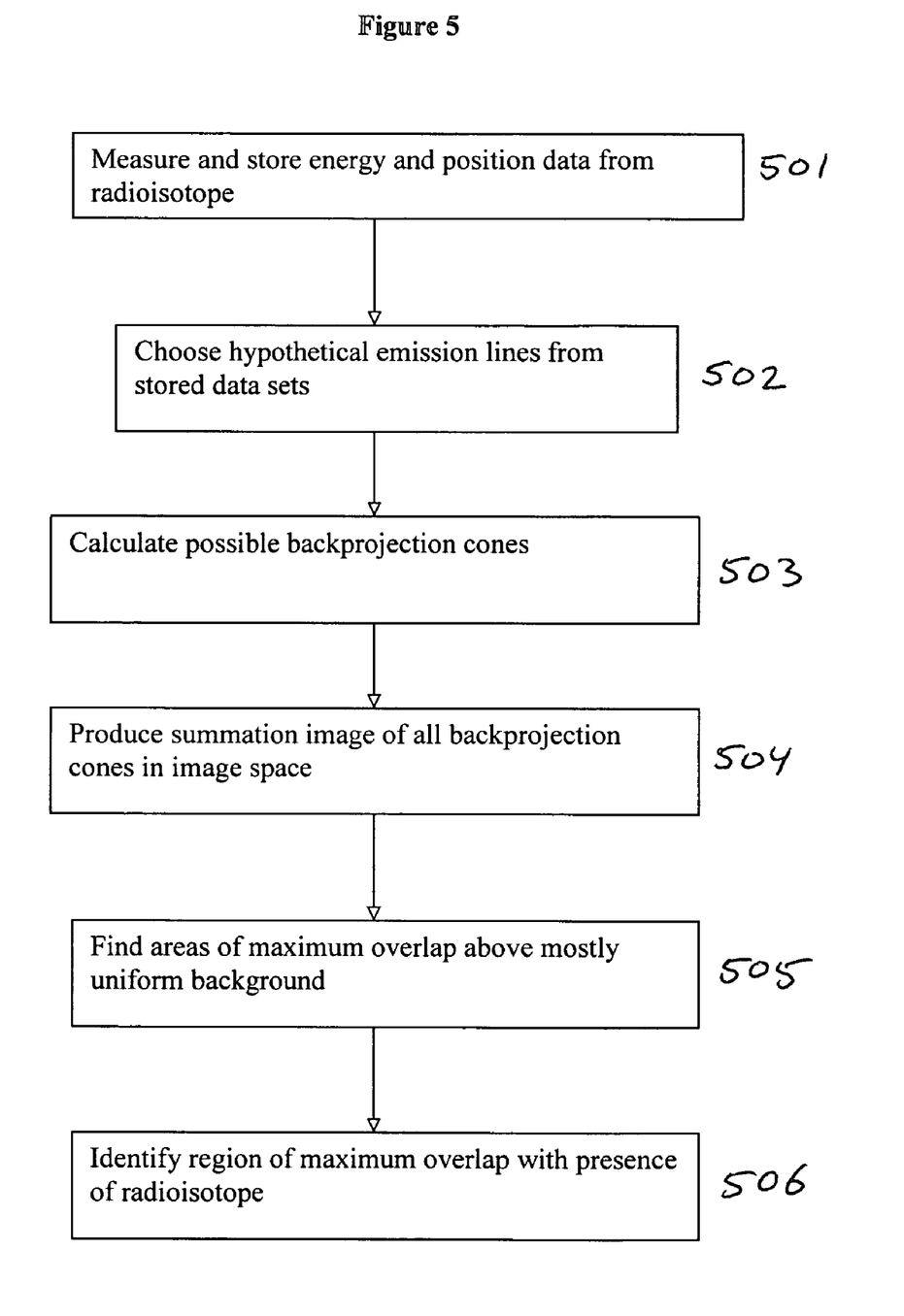
FIG. 5 is a flow chart showing the data analysis and processing for creating an image space corresponding to true and random backprojection cones.

The measured energy, timing or coincidence, three dimensional positions are recorded for further processing in a data storage device 501. Most typically this data storage device will be the storage memory of a computer, such as a hard disk drive or into other digital memory of the computer. Alternative means to store data may be used if it provides the capability to further process the data as described in this specification. Timing information is used to determine if there is coincidence between two or more interaction vertices. Timing information for each vertex can be stored or simply an indication that the vertices are connected in coincidence may be used. The timing information establishes that the vertices are part of the same Compton scatter event. Energy data is typically produced as the channel output from an ADC and the digital channel is stored or can be converted to another scale such as a calibrated energy value. Energy calibration may occur here but can also occur later in the processing in connection with or prior to looking up hypothetical gamma lines 502. When multiple detectors are used as the gamma ray detector then a detector identifier or equivalent will be recorded with the event information. If a mobile detector is used, either alone or with other detectors (mobile or stationary) then the detector identifier (if more than one detector) and position of mobile detectors will be recorded. Position measurement of the mobile detectors can be accomplished by several techniques including GPS signals, encoded position readouts, RF tagging, optical systems and other means know to those skilled in the art or yet to be developed.

This system uses the knowledge of the known gamma ray emission lines from suspected radioisotopes. The gamma ray lines are cataloged and available to those skilled in the art or nuclear spectroscopy or radioisotope identification. In addition to the energy of the gamma array lines the relative emission strengths of the lines can be included if available. One such depository of gamma ray emission lines is the National Nuclear Data Center of the National Institute of Standards and Technology (NIST) of the United States Department of Commerce. This emission line data is loaded into the system in a readable form. The most common means to store this information is into the storage memory of a computer such as a hard disk drive or into other digital memory of the computer. Other means that can accomplish the same function are within the scope of this invention.

Within the calculation of possible backprojection cones arising from a set of vertices, the energy of the original gamma ray is typically unknown. If energy information is available for both vertices then the energy of the original gamma ray associated with a set of Compton vertices is equal to (in consideration of detector energy resolution limitations) or greater than the sum of the energies corresponding to the set of vertices. From the set of possible gamma ray lines under consideration for the particular radioisotope identification and localization task engaged a possible gamma ray line is chosen 605, 502 whose energy is equal to or greater than the measured energy for the event. From the subset of emission lines with acceptable energy, multiple methods of selection are possible. In one method, all acceptable emission lines are chosen for backprojection calculation. Then each cone is calculated and backprojected with equal weights to form a total image. In another method using all the acceptable emission lines the cones are backprojected using weights proportional to emission branching ratios and energy dependant detector efficiency. Another method will use emission lines from a single isotope and backproject them either with or without a weighting factor.

The equation for Compton scattering relates the angle the photon is deflected from its path ($\phi$) to the energies of the scattered (hv) and incident ($hv_0$) photons:

$$\varphi = \cos^{-1}\left[1 - m_0 c^2 \left(\frac{1}{hv} - \frac{1}{hv_0}\right)\right]. \quad \text{Equation 1}$$

Figure 3:
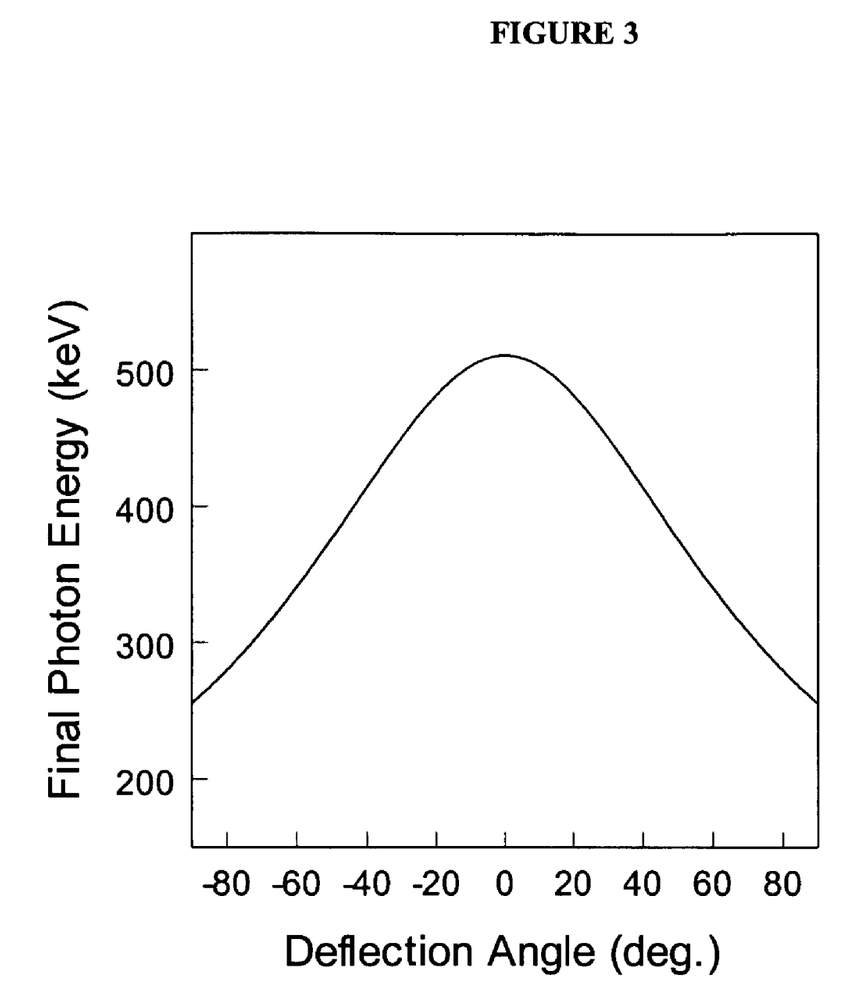
FIG. 3 shows the final (scattered) photon energy from Compton scattering of 511 keV gamma rays as a function of deflection angle.

This angle provides the basis for all reconstruction algorithms involving Compton scattering. If the scattered photon energy is known, the angle of deflection can be obtained from knowledge of the incident photon energy. For example, FIG. 3 is a plot of the final photon energy as a function of deflection angle $\phi$ for Compton-scattered positron annihilation gamma rays ($hv_0$=511 keV).

Figure 4:
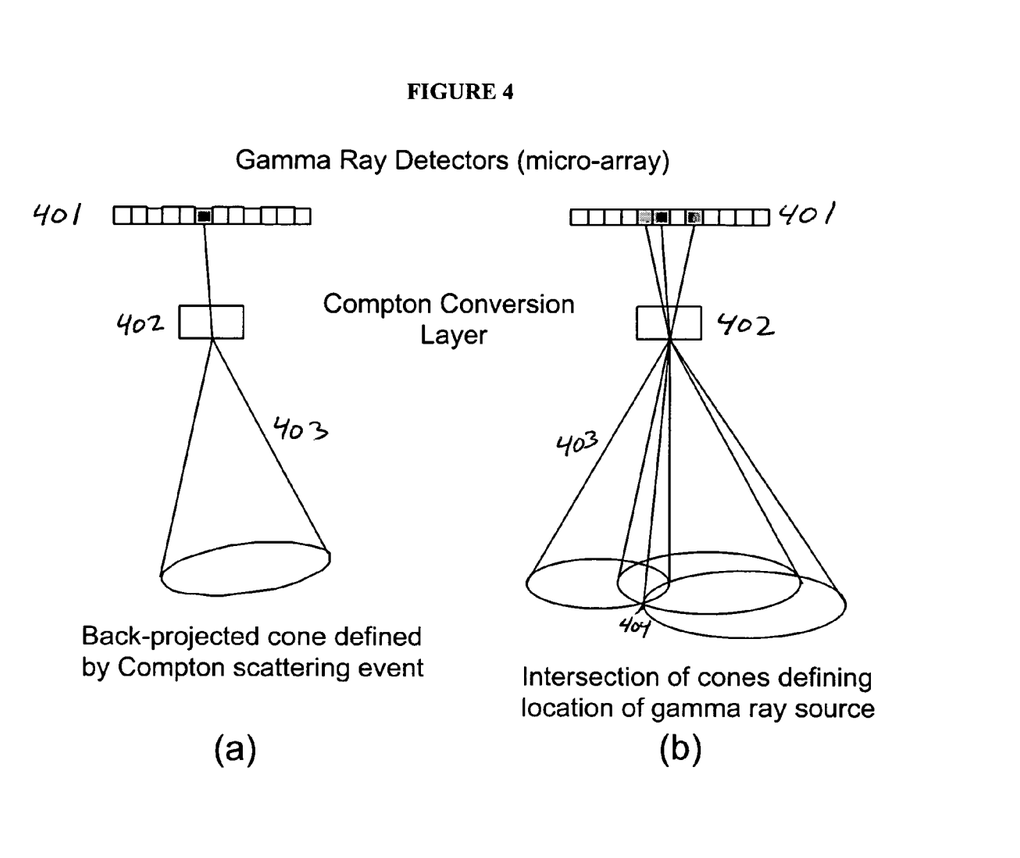
FIG. 4 shows diagrams of conical surface backprojected from measurement of scattered photon energy at a specific detector (a), and conical surfaces from three detector events indicating the most probable location of the source at the intersection of the circles (b).

Since any azimuthal deflection is possible the direction of the initial photon in three-dimensional space can be limited to a cone 403 (FIG. 4a). Note the direction of the final photon also needs to be determined, which in this example is accomplished with the use of a detector array 401. In general, three or more measurements are acquired by the detector to pinpoint the source 404, 103 of the initial gamma photon (FIG. 4b). This is accomplished with the use of reconstruction methods that essentially determine the intersection of the backprojected cones. This intersection represents the most probable location of the radioactive material.

For each coincidence event, the spatial coordinates for two or more vertices are identified along with the energy deposited in the detector at the associated vertices. In some cases, the first point of interaction is distinguishable form the second point of interaction due to the energy partitioning according to the physics of Compton scattering. In other cases it will not be possible to distinguish which is the first interaction vertex and which is the second interaction vertex. In cases with more than two interaction vertices in coincidence it is unknown what vertex is the first, second, third, etc. For those cases where it is possible to assign an unambiguous first interaction point, that unambiguous first interaction point is used as the origin of the backprojection cone. The axis of the cone is established as the line from the first vertex to the second interaction vertex. The backprojection cone 403 is then the cone originating from the origin with an axis to cone surface angle equal to $\phi$ as calculated from equation 1. The energy of the incident photon ($hv_0$) is chosen 605 from the table of possible emission lines as the hypothetical incident energy and the energy of the scattered photon (hv) is the energy of the incident photon minus the measured interaction energy at the first vertex.

For those cases where it is not possible to assign an unambiguous first interaction point, two projections are calculated with each vertex used as the origin of the backprojection cone. The axis of the cone is established as the line from the assumed first vertex to the remaining second interaction vertex. The backprojection cone is then the cone originating from the origin with an axis to cone surface angle equal to $\phi$ as calculated from equation 1. The energy of the incident photon ($hv_0$) is chosen from the table of possible emission lines as the hypothetical incident energy and the energy of the scattered photon (hv) is the energy of the incident photon minus the measured interaction energy at the first vertex. For events with more than two coincidence vertices, each vertex will be used as the origin with the line to each other vertex as the axis. In configurations where not all the detectors produce an energy measurement, only the detector events that have energy measurement are used as origins for backprojection cones.

One means of measuring overlap of calculated backprojection cones is to fill the image space with backprojection cones and look for the region of maximum overlap (as outlined in FIG. 5). From the measured data set the set of hypothetical emission lines 502 from a single radioisotope or a set of know related radioisotopes (for example as might be found in a nuclear weapon with a mix of radioisotopes and daughter radioisotopes) compatible with the data is identified. The backprojection cones 503 are calculated for each of the hypothetical emission lines for each of the event data. The backprojection cones 503 are added 504 to an image space resulting in an image with relatively uniform background. The relatively uniform background is a result of the backprojection cones that do not correlate with the actual energies and directions of the gamma rays that produced the event data. This background is spatially uncorrelated because on average the incorrect cones direction and angles will be random. If that radioisotope is present then the set of correct backprojection cones will intersect at a point corresponding to the location of the radioisotope. Examination of the image space for such a region of maximum intensity 505 corresponds with a positive identification of the presence and position of the radioisotope 506. If no region of enhanced image intensity is present another possible radioisotope can be used to process the data. The system may examine all possible radioisotopes in its library if necessary to find the source of radiation.

An alternative evaluation process follows the flow chart of FIG. 6. In this process backprojection cones are projected into an image space. Regions of overlap are identified for the set of backprojected cones. Additional events are backprojected into the image space and areas of multiple overlap identified. This process looks for regions of overlap for multiple possible events 607. When regions are identified they are stored and event cones that do not produce overlap are recalculated 611 using an alternative emission line hypothesis 605. In this manner the data set is searched through for possible radioisotopes that result in a region of multiple overlap. If no region of multiple overlap is identified, the process begins again with another radioisotope chosen for hypothetical emission lines.

Additional means common in imaging techniques can be used to create the explore the overlap space of the backprojection cones. A reconstruction algorithm for the linear superposition method is as follows. First, the algorithm constructs conical shells arising from the backprojections. This procedure is executed using spherical harmonic expansions and coordinate transformations for different coordinate systems that are specific to each detector. Other geometric approaches for constructing the shells are known. The algorithm then assigns unit amplitudes to the shells. Linear superposition of these shells in the image space will sum the amplitudes where multiple shells intersect. The amplitudes will therefore be proportional to the number of events (cones) that coincide (intersect) in space. Identification of the 3D location of the source will therefore be produced.

Matrix methods for Compton search array reconstruction may use multiple spherical coordinate systems with coordinate transformations between systems. Iterative solution methods are combined with a generalized voxel in the reconstruction algorithm.

Matrix methods are a straightforward approach for reconstructing images from tomographic or similar data sets. The reconstruction problem is formulated as a transformation between the space/source distribution to be imaged and the response of the detectors. This transformation is a function of the geometry of the photon paths and the detector positions. By expressing the transformation as a set of linear equations (i.e., the projection matrix), the reconstruction problem can be solved using matrix algebra (e.g., matrix inversion). Matrix reconstruction is sometimes called the algebraic reconstruction technique (ART).

Matrix inversion methods have been presented for Compton cameras. Symmetries in the reconstruction problem were used to simplify the algorithm. The sampling geometry consisted of nested hemispherical shells sectioned into a grid of voxels of uniform angular size ($\Delta\theta$ and $\Delta\phi$). The voxels were approximated with polyhedrons to compute the relationship between the image space and the projection matrix. Finally, the 3D spatial computations were simplified by transforming the matrices into the 2D Fourier domain and solving the matrix equation with an iterative reconstruction algorithm. Iterative solution of matrix equations offers several advantages in reconstruction problems, particularly for very large or very sparse matrices where matrix inversion is difficult or inaccurate.

Direct linear superposition of backprojected images can be an effective reconstruction method, and is essentially an extension of the triangulation method. For Compton scattering, the backprojected images would be comprised of the conical shells representing regions with a high probability of containing a radioactive source. Superposition of these shells defines regions of higher probability (i.e., where the shells intersect) for location of the source distribution. Backprojection algorithms that use linear superposition (summation over all detected events) are known in the art for Compton scattering data.

One embodiment of the system operates in the following manner. A network of small radiation detectors 101 with 3-D position readout are dispersed preferably around the perimeter of the area to be controlled (see FIG. 1). These detectors are networked together and feed their data to a central processing station. If a radiation source is present, several (at least about 3) Compton scatter events (at least the primary and secondary interaction vertices and the energy of the primary interaction) are recorded from the network. In each detector we do not know which interaction vertex is the primary and which interaction vertex is the secondary. Coincidence within each detector module tells us that the events are part of the same Compton interaction event. The event rate can be very slow and events in multiple detectors are accumulated for analysis over any desired data acquisition time needed to control the area.

When multiple events are recorded the data are analyzed to compute possible Compton projection cones from the vertices. An assumption is made that the events are from a particular radioisotope 502 with emissions equal or greater energy than measured by the sum of the energies for the two coincident Compton vertices. For example, if a coincidence produces a sum of energy for an event of 700 keV, we compute possible trajectories for known radioisotope gamma rays, for the radioisotope hypothesis, greater than or equal to 700 keV. Using the proposed energies of the suspected gamma rays, the projection cones are analyzed to determine if a single point of intersection exists (to within error calculated from known energy and spatial resolutions of the detector). If a true single source of radiation is emitting the radiation at that energy, then a single point of intersection will be found by the cone projection analysis (see FIGS. 1 and 4). If the events are random then the probability of producing a single interaction point will be very small. Additional events in any case can bring false positives to any desired lower limit. A threshold level can be set to trigger identification of the radiation source.

Multiple energies from the analysis data base are used to see if the projection cones produce a single focal point of interaction. If multiple energies are known to be emitted from a suspected source then multiple energies can be tested (consistent with emission energy larger or equal to the detected energy). When a single focal point is detected, it indicates that a particular isotope (that associated with the energies used to analyze the data) is present and the location of the source is identified as that detected point (see the flow chart in FIG. 6).

If the system is deployed around the perimeter of a control area, the system has the highest sensitivity for sources located within the perimeter but is still sensitive to sources outside the perimeter. The system has superior localization because the detectors are situated at various locations around the control area and angular dependent resolution is combined from those multiple positions (FIG. 1). Conventional detectors situated at a single location will have difficulty localizing a source that is more distant from the detector. Because the detectors are small modules the system can be expanded by adding more detectors modules at more locations to improve sensitivity or to monitor a larger area.

An efficient and robust method is disclosed for finding the location of hidden and/or shielded radioactive materials in buildings and outdoor areas based on the principles of Compton scattering. Specific applications for this technology include the control of nuclear materials in processing and power plants; surveys of warehouses, bunkers, and other storage facilities for locating strategic nuclear materials; and the monitoring of transportation facilities and other areas for conventional explosives mixed with radioactive materials ("dirty bombs").

In a similar manner, the Compton search array would use three or more widely spaced detectors to triangulate on the location of radioactive material (FIG. 1). Note the intersection of two cones would form a line curving in three dimensions. The addition of a third cone produces additional lines, with the source location defined by the intersection of either the three conical surfaces or the corresponding set of two-cone lines. Backprojected cones from additional detectors would further refine the location determination Since the energy of the initial gamma photon is required for determining the deflection angle, one mode of operation for the Compton search array would be to look for specific radionuclides (e.g., plutonium) with distinct peaks in their gamma ray spectra. Alternatively, a gamma ray spectrometer could be used concurrently with the Compton search array to identify the radioactive materials and their strongest gamma ray peaks.

Several reconstruction methods are available for analyzing data from the disclosed Compton search array. Two basic approaches that have been extensively researched for Compton camera imaging; matrix methods and linear superposition.

We use computational methods for reconstructing the backprojected cones in three-dimensional space and determining the intersection points of the cones. The reconstruction method accommodates arbitrarily positioned detectors, and therefore a variety of imaging volumes and multiple cone geometries. Spreading of the cones due to energy and position uncertainties would also require consideration, and a "probability of location" analysis may be used since multiple intersection points may result from events detected from gamma rays of different energies.

The image quality and resultant location accuracy from the Compton search array will be dependent on the number of events detected.

The initial energy of the gamma ray is treated as unknown. Search algorithms based on the known physical distributions, attenuation and energy dependent detector response provide the most optimum searching methods for the actual gamma ray energies. These search algorithms involve searching for solutions causing multiple events backprojections to intersect.

Because of their similarity, reconstruction methods developed for Compton cameras and SPECT imaging systems may be adaptable to Compton search array data. The majority of reconstruction methods developed for Compton imagers use the backprojection method. The backprojection method is based on the physics of Compton scattering, and is often combined with other tomographic methods such as line integrals, Radon inversion, Fourier transform inversion, and iterative techniques. Methods have also been developed to facilitate reconstruction of backprojections using spherical harmonic expansions.

In backprojection, Compton scattering is analyzed in a reverse fashion. Measuring the angle and energy of the Compton-scattered photon defines a conical surface in space from which the incident photon originated. Uncertainties in both the angular and energy measurements, however, convert the idealized conical surface into a more realistic conical shell. This shell is the region in space defined by the probe to contain the photon source. The backprojection method reconstructs these conical surfaces or shells from multiple detection events (photons). The intersections of the surfaces or shell volumes pinpoint the most probable locations of the emission sources.

A Compton search array would be configured to surround the area of inspection as much as practical. This may include the placement of detectors at different elevations (stair platforms, roof supports, and ceilings) as well as floor (or ground) positions. The reconstruction is fully three-dimensional with a variable reconstruction geometry. In contrast to the Compton camera, the Compton search array will sample gamma rays from a much wider range of angles. In tomography, greater coverage typically results in more accurate and robust image reconstruction.

The above description discloses the invention including preferred embodiments thereof. The examples and embodiments disclosed herein are to be construed as merely illustrative and not a limitation of the scope of the present invention in any way. It will be obvious to those having skill in the art that many changes may be made to the details of the above-described embodiments without departing from the underlying principles of the invention.

What is claimed is:

1. A radioisotope identification device comprising;
at least one radiation detector having three dimensional event localization,
said radiation detector producing event data from simultaneous interactions within said detector with gamma rays produced by at least one external radioisotope,
a means to store said event data,
a data set of emission gamma-ray energies characteristic of suspect radioisotopes,
a means to store said data set of emission gamma-ray energies characteristic of suspect radioisotopes,
a means to select a hypothetical emission gamma-ray energy for each of more than one event datum from said event data,
a means to calculate backprojection cones from the event datum combined with said hypothetical emission gamma-ray energy,
calculating backprojection cones for each said more than one event datum from said event datum combined with said hypothetical emission gamma-ray energy,
a means to measure overlap of said calculated backprojection cones,
a means to identify spatially correlated multiple overlap events, and
identifying said spatially correlated multiple overlap event with presence of radioisotope.

2. The radioisotope identification device of claim 1 wherein;
said radiation detector provides information on the energy of the detected gamma ray event vertices deposited in said detector.

3. The radioisotope identification device of claim 1 further comprising;
at least two said radiation detectors.

4. The radioisotope identification device of claim 3 wherein;
said radiation detectors provide information on the energy deposited in said detector of the detected event vertices.

5. The radioisotope identification device of claim 4 wherein;
the said means to identify said mobile radiation detector's position is a GPS unit.

6. The radioisotope identification device of claim 1 wherein;
at least one said radiation detector is mobile, and
a means to identify said mobile radiation detector's position and orientation.

7. The radioisotope identification device of claim 1 further comprising;
at least three said radiation detectors.

8. The radioisotope identification device of claim 1 wherein;
at least one said radiation detectors uses a NaI type scintillator.

9. The radioisotope identification device of claim 1 wherein;
at least one said radiation detectors uses a CsI type scintillator.

10. The radioisotope identification device of claim 1 wherein;
at least one said radiation detectors uses a CZT type solid state detector.

11. The radioisotope identification device of claim 1 wherein;
at least one said radiation detectors uses a Gas type detector.

12. The radioisotope identification device of claim 1 wherein;
a maximum likelihood estimator is used to measure overlap of said calculated backprojection cones.

13. The radioisotope identification device of claim 1 wherein;
a geometric intersection is used to measure overlap of said calculated backprojection cones.

14. The radioisotope identification device of claim 1 wherein;
a filtered backprojection is used to calculate said calculated backprojection cones.

15. A method of radioisotope identification comprising;
measuring of three dimensional event localization data,
transferring said three dimensional event localization data to a computer;
using said computer to select a hypothetical emission gamma-ray energy for each of more than one event datum from said event localization data,
calculating on said computer backprojection cones for each said more than one event datum using said event datum combined with said hypothetical emission gamma-ray energies,
measuring on said computer overlap of said calculated backprojection cones,
identifying spatially correlated multiple overlap events, and
identifying said spatially correlated multiple overlap event with presence of radioisotope.

16. The method of claim 15 wherein;
the said measuring of three dimensional event localization data involves measuring data from more than one observation position.

17. The method of claim 15 further comprising;
measuring the energy of said events for at least one interaction vertex per event.

18. The method of claim 15 further comprising;
measuring the energy of said events for at least two interaction vertices per event.

19. The method of claim 15 wherein;
a maximum likelihood estimator is used to measure overlap of said calculated backprojection cones.

20. The method of claim 15 wherein;
a geometric intersection is used to measure overlap of said calculated backprojection cones.

21. The method of claim 15 wherein;
a filtered backprojection is used to calculate said calculated backprojection cones.

22. A method of radioisotope identification comprising;
measuring of three dimensional event localization data from two or more event vertices,
measuring event energy data from said event vertices,
transferring said three dimensional event localization data to a computer;
using said computer to select a hypothetical emission gamma-ray energy for each of more than one event datum from said event localization data,
a) calculating backprojection cones on said computer for each said more than one event datum using said event datum combined with said hypothetical emission gamma-ray energies,
b) calculating on said computer overlap of said calculated backprojection cones,
c) using said computer to identify spatially correlated multiple overlap events from said calculated overlap,
d) using said computer to select alternative hypothetical emission gamma-ray energies for each of more than one event datum from said event localization data,
iterating steps a), b), c) and d) for alternative said hypothetical emission gamma-ray energies, and
identifying said spatially correlated multiple overlap events with presence of radioisotope.

* * * * *